(12) United States Patent
Schneider et al.

(10) Patent No.: US 10,747,413 B2
(45) Date of Patent: Aug. 18, 2020

(54) APPARATUSES, METHODS AND COMPUTER PROGRAMS FOR CONTROLLING A MACHINE

(71) Applicants: Deere & Company, Moline, IL (US); Fraunhofer-Gesellschaft zur Förderung der angewandten Forschung e.V., Munich (DE)

(72) Inventors: Daniel Schneider, Kaiserslautern (DE); Thomas Kuhn, Langensohl (DE); Rasmus Adler, Kaiserslautern (DE); Viet Yen Nguyen, Kaiserslautern (DE); Patrik Feth, Hochspeyer (DE); Emilia Cioroaica, Kaiserslautern (DE); Bastian Zimmer, Kaiserslautern (DE); Martin Kremmer, Mannheim (DE); Thomas Floerchinger, Mannheim (DE); Benjamin Neermann, Mannheim (DE); Norbert Fritz, Ilvesheim (DE); Stefan Volz, Mannheim (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 117 days.

(21) Appl. No.: 15/341,097

(22) Filed: Nov. 2, 2016

(65) Prior Publication Data
US 2017/0228145 A1 Aug. 10, 2017

(30) Foreign Application Priority Data
Nov. 5, 2015 (EP) .................................... 15193248

(51) Int. Cl.
*B60Q 1/00* (2006.01)
*G06F 3/0484* (2013.01)
(Continued)

(52) U.S. Cl.
CPC ........ *G06F 3/04847* (2013.01); *A01B 59/002* (2013.01); *A01B 71/02* (2013.01);
(Continued)

(58) Field of Classification Search
CPC .. G06F 3/04847; G06F 3/0482; G06F 3/0484; G06F 3/04842; G06F 3/0488;
(Continued)

(56) References Cited

U.S. PATENT DOCUMENTS 5,421,416 A * 6/1995 Orbach ............... A01B 63/1117
172/3
6,091,324 A * 7/2000 Arsenault ............. G01K 15/00
340/449

(Continued)

FOREIGN PATENT DOCUMENTS

| DE | 102008047089 A1 | 3/2010 |
|---|---|---|
| DE | 102014211712 A1 | 2/2015 |
| EP | 2821864 A1 | 1/2015 |

*Primary Examiner* — Scott T Baderman
*Assistant Examiner* — Hassan Mrabi
(74) *Attorney, Agent, or Firm* — 2SPL Patent Attorneys PartG mbB; Kieran O'Leary (57) ABSTRACT

Embodiments relate to apparatuses, methods and computer programs for controlling a machine. The apparatus is suitable for a mobile communication device for providing a sensor input signal to a machine control entity to control a machine. The apparatus comprises one or more sensor modules for providing first user input sensor data and second user input sensor data. The apparatus further comprises a control module configured to determine the sensor input signal based on the first user input sensor data and the second user input sensor data. The control module is further configured to provide the sensor input signal for sensor data processing to the machine control entity to control the machine via an interface.

18 Claims, 7 Drawing Sheets

(51) Int. Cl.
*G05B 19/042* (2006.01)
*A01D 34/00* (2006.01)
*G08C 17/02* (2006.01)
*A01B 71/02* (2006.01)
*A01B 59/00* (2006.01)
*G06F 3/0346* (2013.01)
*G06F 3/0488* (2013.01)

(52) U.S. Cl.
CPC ....... *A01D 34/008* (2013.01); *G05B 19/0426* (2013.01); *G06F 3/0346* (2013.01); *G06F 3/04886* (2013.01); *G08C 17/02* (2013.01); *G05B 2219/36159* (2013.01); *G08C 2201/93* (2013.01)

(58) Field of Classification Search
CPC ... G06F 3/04886; G06F 3/0346; A01B 71/02; A01B 59/002; G08C 17/02; G08C 2201/93; A01D 34/008; G05B 19/0426; G05B 2219/36159

USPC ......................................................... 715/772
See application file for complete search history.

(56) References Cited

U.S. PATENT DOCUMENTS

| | | | |
|---|---|---|---|
| 9,495,876 B2 * | 11/2016 | Lu | B60R 1/00 |
| 2008/0076637 A1 * | 3/2008 | Gilley | G06F 19/3475 |
| | | | 482/9 |
| 2010/0258682 A1 * | 10/2010 | Fries | B61L 3/121 |
| | | | 246/1 C |
| 2014/0114478 A1 | 4/2014 | Williams et al. | |
| 2014/0172197 A1 | 6/2014 | Ganz et al. | |
| 2014/0221768 A1 * | 8/2014 | Krupnik | A61B 5/7455 |
| | | | 600/301 |
| 2016/0117928 A1 * | 4/2016 | Hodges | G07C 5/008 |
| | | | 701/99 |
| 2017/0140652 A1 * | 5/2017 | Hodges | G07C 5/008 |

\* cited by examiner

Slide&Circle

Fig. 3b

Slide&Tilt

APPARATUSES, METHODS AND COMPUTER PROGRAMS FOR CONTROLLING A MACHINE

TECHNICAL FIELD

Embodiments relate to apparatuses, methods and computer programs for controlling a machine, more specifically, but not exclusively, based on providing a sensor input signal to a machine control entity.

BACKGROUND

This section introduces aspects that may be helpful in facilitating a better understanding of the invention(s). Accordingly, the statements of this section are to be read in this light and are not to be understood as admissions about what is in the prior art or what is not in the prior art.

Mobile communication devices, especially smartphones and tablet computers, have started transforming large parts of today's life. Especially the rise of mobile communication devices that allow an installation of additional software, so called apps (applications), allow mobile communication devices to be used in a multitude of different scenarios. Applications range from simple messaging, to navigating, to controlling a smart home, while being a large distance away.

All kinds of devices, e.g. kitchen devices, vehicles, or lighting, have recently been equipped with additional communication devices. Many previously unconnected devices are now controllable or observable remotely, e.g. from a mobile communication device or a computer. Even home security, ranging from connected locks to wireless surveillance pods, are now available from the mobile communication device of your choice. Apps sometimes enable an easier controlling and observation of such devices.

The controlling of machines, e.g. of heavy machinery, such as agricultural equipment, industrial machines, or commercial vehicles, is often built on a framework of reliable components. A number of certification standards, such as International Standardization Organization (ISO) 25119 and ISO 12100 regulate a safety and reliability of such controlling. Standardized testing and functional verification are often used to ascertain (to a certain degree) the reliability and fault tolerance of such controlling components.

Further information regarding the controlling of agricultural equipment can be found in patent applications DE 102014211712 A1 and EP 2821864 A1. Patent application DE 102014211712 A1 describes an arrangement for controlling a machine component of an agricultural machine using a machine control entity being wirelessly connected to a portable computer. Patent application EP 2821864 A1 discloses a method for controlling an auxiliary function by a control element in an electronic control system of an agricultural machine based on displaying virtual control elements for controlling the auxiliary function.

SUMMARY OF ILLUSTRATIVE EMBODIMENTS

Some simplifications may be made in the following summary, which is intended to highlight and introduce some aspects of the various exemplary embodiments, but such simplifications are not intended to limit the scope of the invention(s). Detailed descriptions of a preferred exemplary embodiment adequate to allow those of ordinary skill in the art to make and use the inventive concepts will follow in later sections.

Embodiments provide apparatuses, methods and computer programs for controlling a machine. Embodiments provide an apparatus for a mobile communication device and an apparatus for a machine control entity. The apparatus for the mobile communication device has one or more sensor modules and a control module, which determines a sensor input signal based on first and a second user input sensor data, which is based on user input. The sensor input signal may e.g. comprise the user input sensor data, and is provided to the machine control entity for processing of the user input sensor data. The machine control entity obtains the sensor input signal from the apparatus for the mobile communication device, and validates the sensor data. The validation is based on using first user input sensor data of a first sensor to validate second user input sensor data of the second sensor, e.g. by testing for a certain condition of the first input sensor data. If the validation is successful, the machine control entity controls the machine based on the sensor data.

Embodiments provide an apparatus for a mobile communication device for providing a sensor input signal to an external machine control entity to control a machine. The apparatus comprises one or more sensor modules for providing first user input sensor data and second user input sensor data. The apparatus further comprises a control module configured to determine the sensor input signal based on the first user input sensor data and the second user input sensor data. The control module is further configured to provide the sensor input signal for sensor data processing and validation to the machine control entity to control the machine via an interface. Providing the sensor input signal to the machine control entity enables a transfer of the processing to a module or device that can be certified to be reliable (to a point), and may enable the mobile communication device to reliably control the machine. Using different sensor data enables a mutual validation of the sensor data, and may increase a reliability of the controlling.

In various embodiments, the control module may be further configured to obtain a sensor feedback signal from the machine control entity via the interface. The sensor feedback signal may be based on the first user input sensor data and the second user input sensor data. The sensor feedback signal may comprise information related to a validation of the second user input sensor data based on a comparison of the first user input sensor data with a validation criterion. The sensor feedback signal may be used to output, e.g. display, a result of the validation of the first and second user input sensor data, e.g. to avoid a display mismatch between locally determined sensor data and the validated sensor data used at the machine control entity.

In at least some embodiments, the control module may be configured to determine a feedback presentation signal based on the sensor feedback signal. The control module may be further configured to provide the feedback presentation signal to a feedback presentation device configured to provide feedback on the first user input sensor data and the second user input sensor data based on the feedback presentation signal. The sensor feedback signal may be used to output, e.g. display, a result of the validation of the first and second user input sensor data, e.g. to avoid a display mismatch between the locally determined sensor data and the validated sensor data used at the machine control entity.

In various embodiments, the apparatus may further comprise the feedback presentation device. The feedback presentation device may correspond to at least one element of a screen, a vibration module, a light module, an electromechanical tactile display, or a speaker. The feedback presentation device may be configured to provide at least one element of the group of audio, visual and tactile feedback. The control module may be configured to determine and provide a visual representation of the first user input sensor data and/or the second user input sensor data via the feedback presentation device. The sensor feedback signal may be used to output, e.g. display, a result of the validation of the first and second user input sensor data, e.g. to avoid a display mismatch between the locally determined sensor data and the validated sensor data used at the machine control entity.

In various embodiments, the one or more sensor modules may comprise a first sensor module configured to provide the first user input sensor data and a second sensor module configured to provide the second user input sensor data. The one or more sensor modules may comprise at least one element of the group of a touch sensor, an accelerometer, a gyroscope, an infrared sensor, a microphone and a camera sensor. Using different sensors enables a mutual validation or refinement of the sensor data, e.g. by using the second user input sensor data based on a result of the first user input sensor data.

In at least some embodiments, the first user input sensor data and/or the second user input sensor data may correspond to raw user input sensor data. Using raw sensor data may reduce a probability of failure in the mobile communication device, by deferring the processing and validation to the machine control entity.

The first user input sensor data and/or the second user input sensor data may correspond to at least one element of the group of touch screen coordinates, a touch gesture, a voice command, angular data of a gyroscope, acceleration data of an accelerometer, or imaging data of a camera sensor, e.g. a combination of multiple elements of the group. Using different sensor data enables a mutual validation or refinement of the sensor data, e.g. by using the second user input sensor data based on a result of the first user input sensor data.

In various embodiments, the apparatus may further comprise the interface. The interface may correspond to a wireless communication interface for communication via a mobile communication system. The control module may be configured to wirelessly communicate with the machine control entity via the interface. A wireless communication may enhance a flexibility of a user controlling the machine.

In at least some embodiments, the first user input sensor data may correspond to touch screen coordinates. The second input sensor data may correspond to angular data of a gyroscope. The control module may be configured to provide the sensor input signal to the machine control entity to control a hitch of a tractor. Using both touch screen coordinates and angular data to control the hitch of a tractor may e.g. enable an activation, a selection of a hitch, and/or selection of a hitch directivity using the touch screen coordinates, and a control of a distance of the hitch from ground using the angular data, for example.

Embodiments further provide an apparatus for a machine control entity for controlling a machine based on a sensor input signal from a mobile communication device. The apparatus comprises at least one interface for receiving the sensor input signal from the mobile communication device. The sensor input signal comprises information related to first user input sensor data and information related to second user input sensor data. The apparatus further comprises a control module configured to validate the second user input sensor data based on the first user input sensor data. The validation is based on a comparison of the first user input sensor data with at least one validation criterion. The control module is further configured to control the machine based on the first user input sensor data and the second user input sensor data after the second user input sensor data has been validated. Controlling the machine based on the first and second user input sensor data may remove a processing and validation of the sensor data from the mobile communication device, increasing a reliability of the processing. Validating the sensor data may further increase reliability and may help protect against erroneous user input and/or erroneous sensor data.

In at least some embodiments the control module may be further configured to determine a sensor feedback signal based on the first user input sensor data, the second user input sensor data and the validation. The sensor feedback signal may comprise information related to a result of a validation comparison of the second user input sensor data based on the first user input sensor data. The sensor feedback signal may be used to output, e.g. display, a result of the validation of the first and second user input sensor data, e.g. to avoid a display mismatch between the locally determined sensor data and the validated sensor data used at the machine control entity.

In various embodiments, the control module may be further configured to determine a plausibility of the first user input sensor data and the second user input sensor data based on a plausibility criterion. The control module may be configured to control the machine after the first user input sensor data and the second user sensor data has been determined to meet the plausibility criterion. Determining the plausibility may further increase reliability, e.g. by checking for erroneous sensor data.

In at least some embodiments, the control module may be configured to determine whether the first user input sensor data is within a range defined by the validation criterion to validate the second user input sensor data. Using a range may e.g. enable using touch screen coordinates of a gyroscope angle range to validate the sensor data.

In at least some embodiments, the first user input sensor data may correspond to touch coordinates. The control module may be configured to determine whether the touch coordinates are within one of one or more pre-defined areas within a pre-defined coordinate system. The one or more pre-defined areas may represent one or more pre-defined control actions for controlling the machine. Using the touch coordinates may enable a user of the mobile communication device to select options using a touch screen of the mobile communication device, e.g. by selecting or pressing a button, or by navigating a control to an area indicating a valid state.

In various embodiments, the control module may be configured to control the machine based on the first user input sensor data and the second user input sensor data. The control module may be configured to determine a category of the controlling based on the first user input sensor data. The control module may be configured to determine an extent of the controlling based on the second user input sensor data. Using the first user input sensor data to select a category may enable both a validation of the second user input sensor data and a refinement or specification of a usage of the second user input sensor data.

In at least some embodiments, the first user input sensor data may be based on user input related to an unlocking action. The second user input sensor data may be based on user input related to a determination of an extent of the controlling of the machine. Determining the unlocking of the controlling and the controlling itself based on different user input may enhance a reliability and/or safety of the controlling.

In at least some embodiments, the category of the controlling may correspond to at least one element of the group of a directivity of the controlling, a selection of a machine component to be controlled, a selection of a controlling sensitivity, and a selection of controlling limits. Using the first user input sensor data to select a category may enable both a validation of the second user input sensor data and a refinement or specification of a usage of the second user input sensor data.

Embodiments further provide a method for a mobile communication device for providing a sensor input signal to an external machine control entity to control a machine. The method comprises providing first user input sensor data. The method further comprises providing second user input sensor data. The method further comprises determining the sensor input signal based on the first user input sensor data and the second user input sensor data. The method further comprises providing the sensor input signal for sensor data processing and validation to the machine control entity to control the machine.

Embodiments further provide a method for a machine control entity for controlling a machine based on a sensor input signal from a mobile communication device. The method comprises receiving the sensor input signal from the mobile communication device. The sensor input signal comprises information related to first user input sensor data and information related to second user input sensor data. The method further comprises validating the second user input sensor data based on the first user input sensor data. The validation is based on a comparison of the first user input sensor data with at least one validation criterion. The method further comprises controlling the machine based on the first user input sensor data and the second user input sensor data after the second user input sensor data has been validated.

Embodiments further provide a mobile communication device comprising the apparatus for the mobile communication device. Embodiments further provide a machine control entity comprising the apparatus for a machine control entity. Embodiments further provide a machine comprising the machine control entity.

Embodiments further provide a computer program having a program code for performing the above method, when the computer program is executed on a computer, a processor, or a programmable hardware component. A further embodiment is a computer readable storage medium storing instructions which, when executed by a computer, processor, or programmable hardware component, cause the computer to implement one of the methods described herein.

BRIEF DESCRIPTION OF THE SEVERAL VIEWS OF THE DRAWINGS

Some other features or aspects will be described using the following non-limiting embodiments of apparatuses or methods or computer programs or computer program products by way of example only, and with reference to the accompanying figures, in which.

DESCRIPTION OF EMBODIMENTS

Various example embodiments will now be described more fully with reference to the accompanying drawings in which some example embodiments are illustrated. In the figures, the thicknesses of lines, layers or regions may be exaggerated for clarity. Optional components are illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

In conventional systems, smart phones might not be used for controlling safety-relevant applications. At least some embodiments may provide a functional security concept for using a mobile communication device (e.g. a smartphone) for controlling safety-critical functionality of a machine.

In an exemplary embodiment, a smartphone is paired to a machine control entity. The connection is secured, but unreliable. The smartphone is assumed to be unsafe and unsecure. Embodiments may reduce or avoid unacceptable risks during controlling.

Embodiments may mitigate the relevant sources of danger and reduce an inherent risk of the application to an acceptable amount. Embodiments may be based on core aspects:
  Reducing the application logic of an apparatus for a smartphone
    Relevant application logic may be deferred to a machine control entity
    The machine control entity may validate the actions of the smartphone
  Sequence Monitoring may be used to check the user activity for plausibility
  The information displayed on the smartphone may be controlled by the machine control entity
  The smart phone sensor data and user interaction may be tested for plausibility on the machine control device
    Test plausibility using algorithms
    Provide feedback loop, e.g. using vibration
  Redundant usage of sensor data (first and second user input sensor data)
    Exemplary sensors: touchscreen, gyroscope, acceleration sensor, camera, volume control, power switch, GPS, microphone etc.
  Usage concept (may e.g. also be used for one-handed usage, may lead to adequate ergonomics. A user may look at the hitch without being distracted by using the application. A usage concept may also be similar to a television remote control: A user may extend the smartphone from the body during the usage. A user may further obtain feedback (visual/tactile).

In an exemplary embodiment, a mobile communication device may be used to control a hitch of a tractor using an app. The exemplary embodiment may be based on ascertaining, that failures or errors do not cause bodily harm to the user or other people. The exemplary embodiment may be based on the finding, that controlling a reliability of a smartphone app is not trivial, as smartphones are complex systems, and an analysis of the operating system and hardware may not be feasible due to the complexity and an unavailability of the source code and hardware schematics.

Using smartphones in safety-critical applications is widely regarded as unfeasible. A smartphone often cannot provide the necessary reliability for safety-critical applications. An additional safety concept may protect against untrusted consumer electronics and unreliable communication channels. Embodiments may provide a safety concept for commanding a hitch of a tractor via smartphone in stationary automation.

Embodiments may be based on taking the smartphone and wireless communication "out of the critical path". Embodiments might not implement the application logic on the "unreliable" smartphone, but on a "reliable" machine control entity. In turn, the smartphone might be used as a display+a set of sensors. Embodiments may further provide validated information for the display of the smartphone. Embodiments may detect and mitigate erroneous sensor data, and may reduce an accidental usage of the remote control. Embodiments may further enable that system behavior does not exhibit unacceptable risks.

The system may behave as specified/intended, and deviations may be sufficiently unlikely in relation to associated risks. Embodiments may provide that (some of) the conceivable hazardous user behavior/misuses etc. (e.g. smartphone in pocket) are also safeguarded. Embodiments may further support an application of ISO 25119 and ISO 12100 for mechanical hazards, e.g. a deviation between actual and intended hitch movement.

Failures are one exemplary cause of hazards. "The operator intends to move one hitch but the other hitch moves" is one exemplary hazard cause by failure. Those failures may e.g. stem from usability issues, e.g. unclear hitch selection view, or behavior issues, such as hitch view mix-up, or security issues, where an attacker flips front hitch selection button pressed to rear hitch button pressed or vice versa. Things that can go wrong in use cases may be failure sequences or failure combinations, e.g. the hitch may start moving even though the operator moves neither the slider nor tilts the smartphone. Somebody may be injured due to commission of starting the movement. The movement may start even though the slider is not moved to an end position, or the smartphone is not in the tilt position. The hitch may move faster than intended by the operator (movement of hitch per unit of time is higher than expected).

Safety measures may be taken for achieving safety goals. A safety goal can be supported by several measures. For example, an exemplary safety goal is: The overall system shall only move the front hitch if a front hitch movement is intended, and it shall only move the rear hitch if a rear hitch movement is intended.

Figure 1:
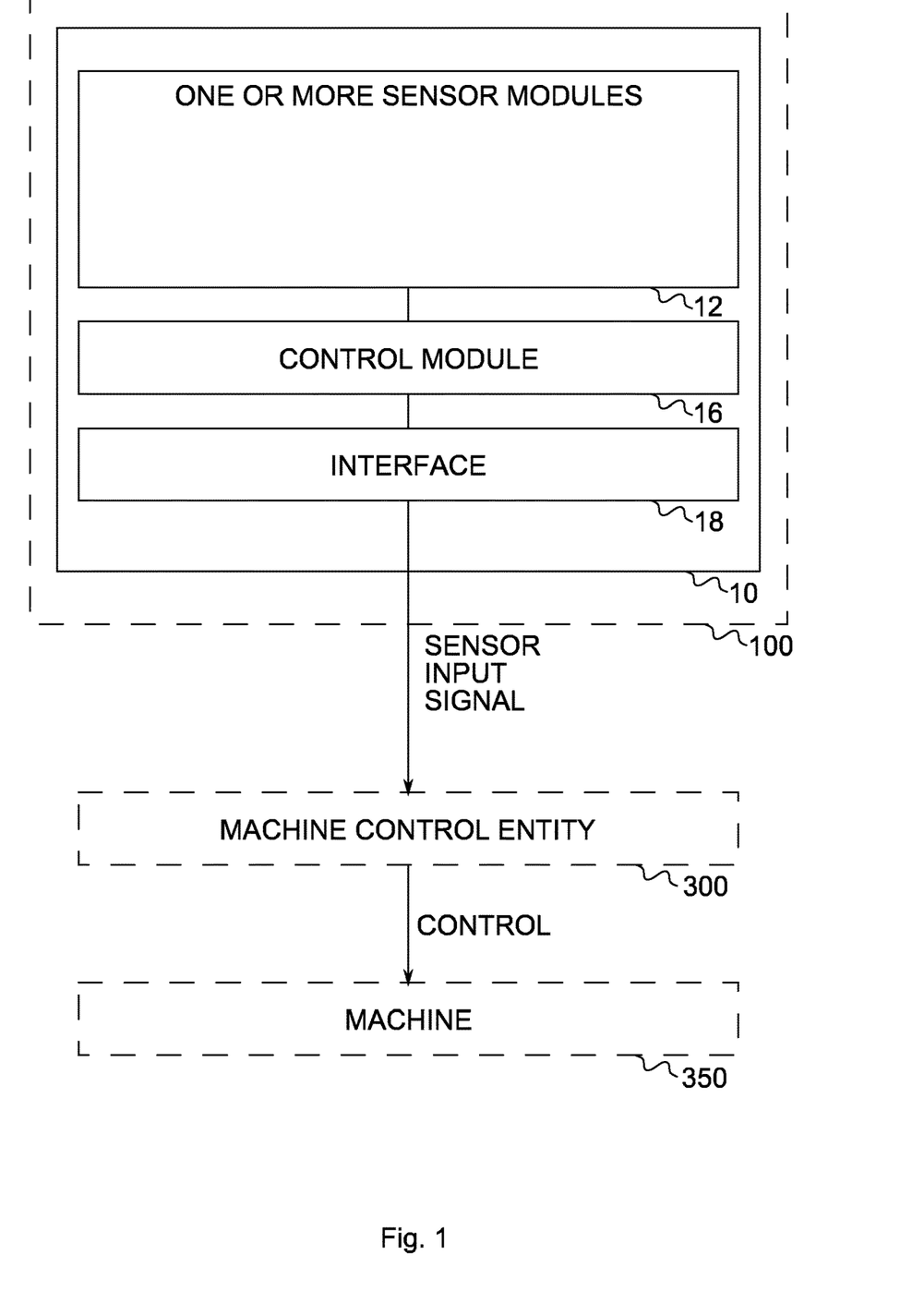
FIG. 1 illustrates a block diagram of an embodiment of an apparatus for a mobile communication device for providing a sensor input signal to a machine control entity to control a machine.

There are be a number of different causes for such failures that at least some embodiments may be safeguarding against during the design of a system:
  Unclear hitch selection view (usability)
    The design of the hitch selection view should be unambiguous with respect to a hitch mix-up, e.g. t system may show the "move front hitch view" if the front hitch was selected in the "hitch selection view".
  Thin client concept: app forwards raw sensor data from mobile communication device
  Sequence monitoring: machine control entity checks sequences of events
  View validation: gateway tells the app which view it should show and checks if this view is actually shown
  "Front hitch button pressed" event instead of "Rear hitch button pressed" event is signaled to the machine control entity (or vice versa)
    May happen due to scheduling/race conditions in non-real time systems Securing/Validating/Check for plausibility the received sensor data FIG. 1 illustrates a block diagram of an embodiment of an apparatus 10 for a mobile communication device 100 for providing a sensor input signal to an external machine control entity 300 to control a machine 350. In embodiments, the external machine control entity is a machine control entity 300 being external to/outside the mobile communication device 100.

In various embodiments, the mobile communication device 100 may e.g. correspond to a mobile phone, a programmable mobile phone, a smartphone, a tablet computer, a slate computer, a laptop computer, a mobile computing device, or a personal digital assistant. The machine 350 may e.g. correspond to an agricultural machine, an industrial machine, a machine for a heavy industry, a vehicle, a transportation machine, a tractor, a hoist, a hydraulic lift, a manlift, an articulated arm, or an extension ladder. The machine 350 may also correspond to a sub-unit of a machine, e.g. a hitch of a tractor, or an articulated arm of an industrial robot. In embodiments the machine control entity 300 may be implemented using one or more processing units, one or more processing devices, any means for processing, such as a processor, a computer or a programmable hardware component being operable with accordingly adapted software. In other words, the described function of the control module 300 may as well be implemented in software, which is then executed on one or more programmable hardware components. Such hardware components may comprise a general purpose processor, a Digital Signal Processor (DSP), a micro-controller, etc. The machine control entity 300 may e.g. be situated with the machine 350, e.g. be comprised in the machine's electronics, or may be located in a communication network and act as a relay, gateway or interpreter between the mobile communication device 100 and the machine 350. In at least some embodiments, the machine control entity 300 may be configured to control one machine, e.g. multiple components of one machine, or the machine control entity 300 may be configured to control a plurality of machines, e.g. a plurality of components of a plurality of machines.

Figure 1A:
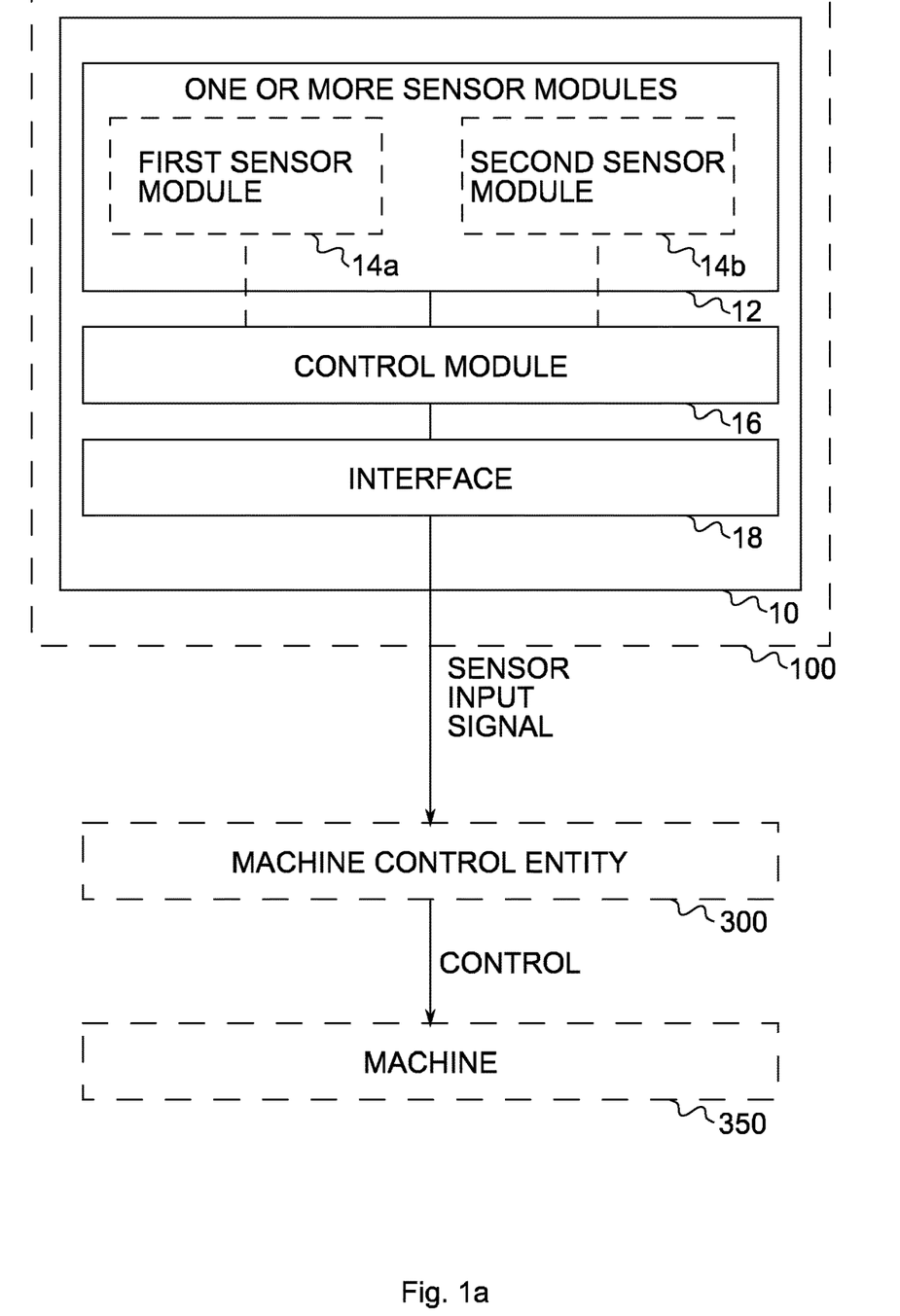
FIG. 1a illustrates a block diagram of a further embodiment of the apparatus, further comprising a first and a second sensor module.

The apparatus 10 comprises one or more sensor modules 12 to provide first user input sensor data and second user input sensor data. For example, the one or more sensor modules 12 may be configured to continuously provide the first user input sensor data and second user input sensor data. For example, at least one of the first user input sensor data and the second user input sensor data may comprise sensor noise. For example, at least one of the first user input sensor data and the second user input sensor data may comprise a continuous user input, e.g. a continuous movement of the mobile communication device or a continuous touch input (e.g. a circle gesture). In at least some embodiments, the one or more sensor modules 12 may comprise a first sensor module 14a configured to provide first user input sensor data and a second sensor module 14b configured to provide second user input sensor data. FIG. 1a additionally shows the first and second sensor modules 14a; 14b. In various embodiments, the one or more sensor modules 12 (and the first and second sensor modules 14a; 14b) may e.g. comprise at least one element of the group of a touch sensor, an accelerometer, a gyroscope, a camera sensor, an acoustic sensor, a time of flight sensor, or a pressure sensor. The first user input sensor data and/or the second user input sensor data may correspond to at least one element of the group of touch screen coordinates, angular data of a gyroscope, acceleration data of an accelerometer, imaging data of a camera sensor, acoustic data, time of flight data, distance information, or pressure data. In various embodiments, the first user input sensor data may be based on user input related to an unlocking action. The unlocking action may e.g. correspond to moving a display element to a target position, pushing a button, bringing the mobile communication device in an angular position, or pressing a touchscreen, e.g. at pre-defined coordinates. The second user input sensor data may be based on user input related to a determination of an extent of the controlling of the machine. The user input related to the determination of the extent of the controlling of the machine may e.g. correspond to changing an angle of the mobile communication device, moving a display element, e.g. a slider user interface element, pushing a button, changing a displayed value, or changing an acceleration or direction of a movement of the mobile communication device.

In at least some embodiments, the first user input sensor data and/or the second user input sensor data corresponds may correspond to raw user input sensor data. The first user input sensor data and/or the second user input may e.g. correspond to sensor data as obtained from sensor modules, which may e.g. be preprocessed, e.g. touch coordinates derived from electric currents and capacitances.

The apparatus 10 further comprises a control module 16 configured to control the one or more sensor modules 12, e.g. the first sensor module 14a and the second sensor module 14b. The control module 16 is configured to determine the sensor input signal based on the first user input sensor data and the second user input sensor data. For example, the control module 16 may be configured to (continuously) obtain at least one of the first user input sensor data and the second user input sensor data from the one or more sensor modules.

The control module 16 is further configured to provide the sensor input signal for sensor data processing and validation to the machine control entity to control the machine via an interface 18. The control module 16 may be configured to determine the sensor input signal by encapsulating the first and second user input sensor data. The control module 16 may e.g. be configured to determine the sensor input signal based on the first and second user input sensor data without altering the first and second user input sensor data. The control module 16 may e.g. be configured to determine the sensor input signal by forwarding the first and second user input sensor data. The control module 16 may e.g. be configured to continuously forward information related to the first user input sensor data and the second user input sensor data using the sensor input signal to the machine control entity. The control module 16 may e.g. be configured to perform pre-processing of the first and second user input sensor data by converting physical properties of components, signals, currents or voltages into digital data, e.g. capacitances into touch screen coordinates, output of a gyroscope into angular data, e.g. without performing additional processing.

In at least some embodiments, the apparatus may further comprise the interface 18. The interface 18 may e.g. correspond to a wireless communication interface for communication via a mobile communication system. The control module 16 may be configured to wirelessly communicate with the machine control entity 300 via the interface 18. The interface 18 may e.g. correspond to a Wireless Local Area Network (WLAN) interface, or it may correspond to an interface for communicating with a cellular mobile communications system, e.g. Universal Mobile Telecommunication System (UMTS), a Long Term Evolution (LTE) mobile communication system, or a cellular mobile communication system of the 5$^{th}$ Generation (5G). The interface 18 may correspond to one or more inputs and/or outputs for receiving and/or transmitting information, which may be in digital (bit) values according to a specified code, within a module, between modules or between modules of different entities. In an exemplary embodiment, the interface 18 may be configured to wirelessly communicate with an interface of the machine control entity, e.g. at least one interface 32 as introduced subsequently. The wireless communication and/or a communication of the at least one interface 32 with a control module 34 of the machine control entity as introduced subsequently may e.g. be based on the International Standardization Organization (ISO) standard 11783.

In various embodiments, the control module 16 may be further configured to obtain a sensor feedback signal from the machine control entity 300 via the interface 18. The sensor feedback signal may be based on the first user input sensor data and the second user input sensor data. In at least some embodiments, the sensor feedback signal may comprise information related to processed versions of the first and/or second user input sensor data, e.g. validated, interpolated versions or versions checked for plausibility of the first and/or second user input sensor data. In various embodiments, the sensor feedback signal may comprise a visual representation of the first and/or second user input sensor data, e.g. as values, as picture data, or as visual interface instruction data. The sensor feedback signal may comprise information related to a validation of the second user input sensor data based on a comparison of the first user input sensor data with a validation criterion. The information related to the validation may correspond to a version of the of the first and/or second user input sensor data that has been validated, a binary representation indicating a validation, a delta between validated user input sensor data and the user input sensor data of the one or more sensor modules 12 and/or processed versions of the first and/or second user input sensor data.

In at least some embodiments, the control module 16 may be configured to determine a feedback presentation signal based on the sensor feedback signal. The feedback presentation signal may e.g. be based on a visual, tactile, audio, or signal representation of sensor data comprised in the sensor feedback signal. As shown additionally in FIG. 1b, the control module 16 may be further configured to provide the feedback presentation signal to a feedback presentation device 20 configured to provide feedback on the first user input sensor data and the second user input sensor data based on the feedback presentation signal. The control module 16 may e.g. be configured to determine and provide a visual representation of the first user input sensor data and/or the second user input sensor data via the feedback presentation device 20. In at least some embodiments, the apparatus may further comprise the feedback presentation device 20. The feedback presentation device may e.g. correspond to at least one element of a screen, a vibration module, a light module, an electromechanical tactile display, or a speaker. The feedback presentation device 20 may e.g. be configured to provide at least one element of the group of audio, visual and tactile feedback. The control module 16 may e.g. be configured to inform a user of the mobile communication device of a progress of the controlling using tactile, e.g. vibration, sound or display feedback, e.g. by indicating a start or progress of the controlling using vibrations.

Figure 1B:
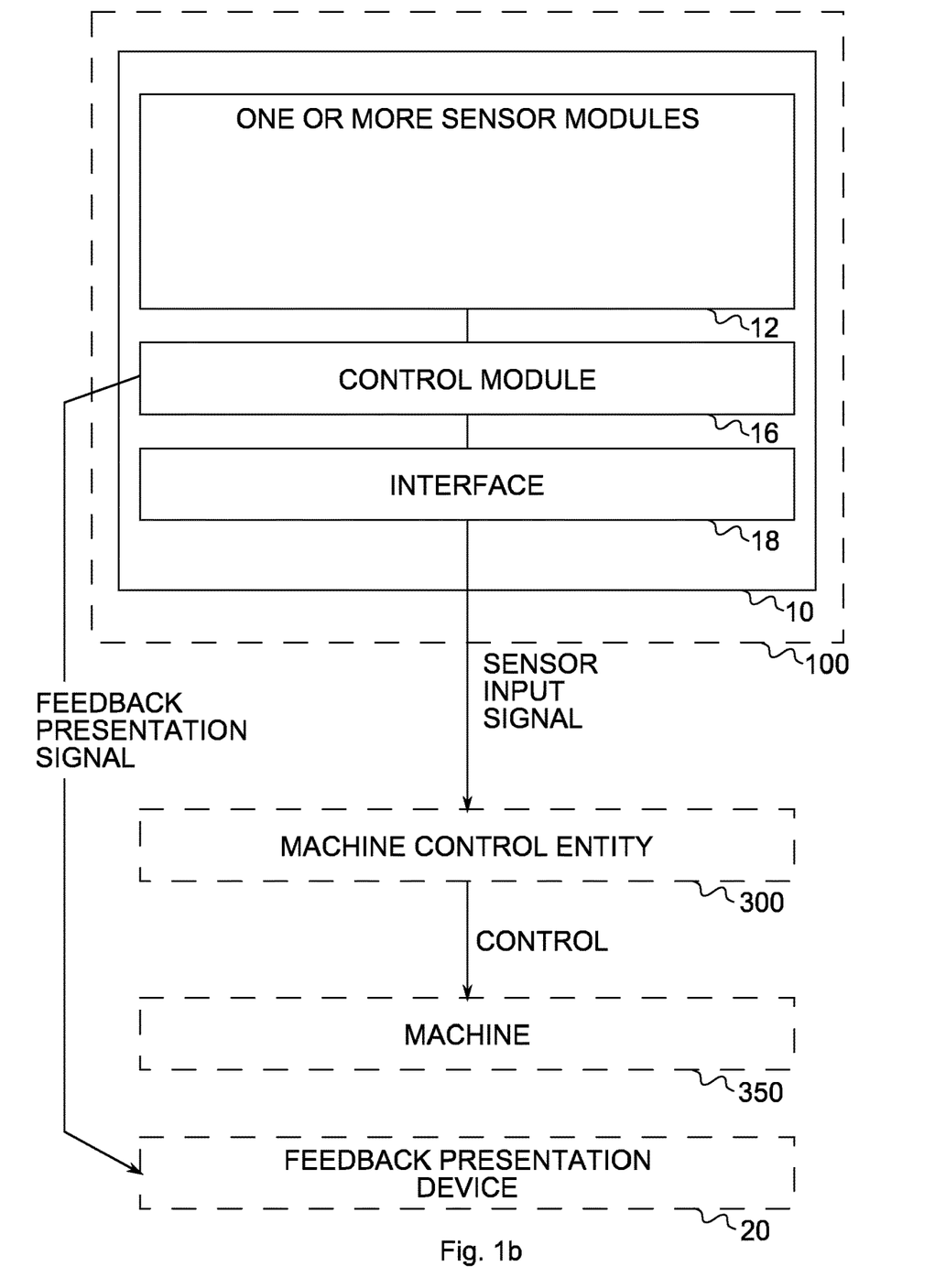
FIG. 1b illustrates a block diagram of a further embodiment of the apparatus further showing a feedback presentation device.

The control module 16 is coupled to the one or more sensor modules 12, e.g. the first and second sensor modules 14a; 14b. The control module 16 is further coupled to the optional interface 18. The control module 16 is further coupled to the optional feedback presentation device 20.

Figure 2:
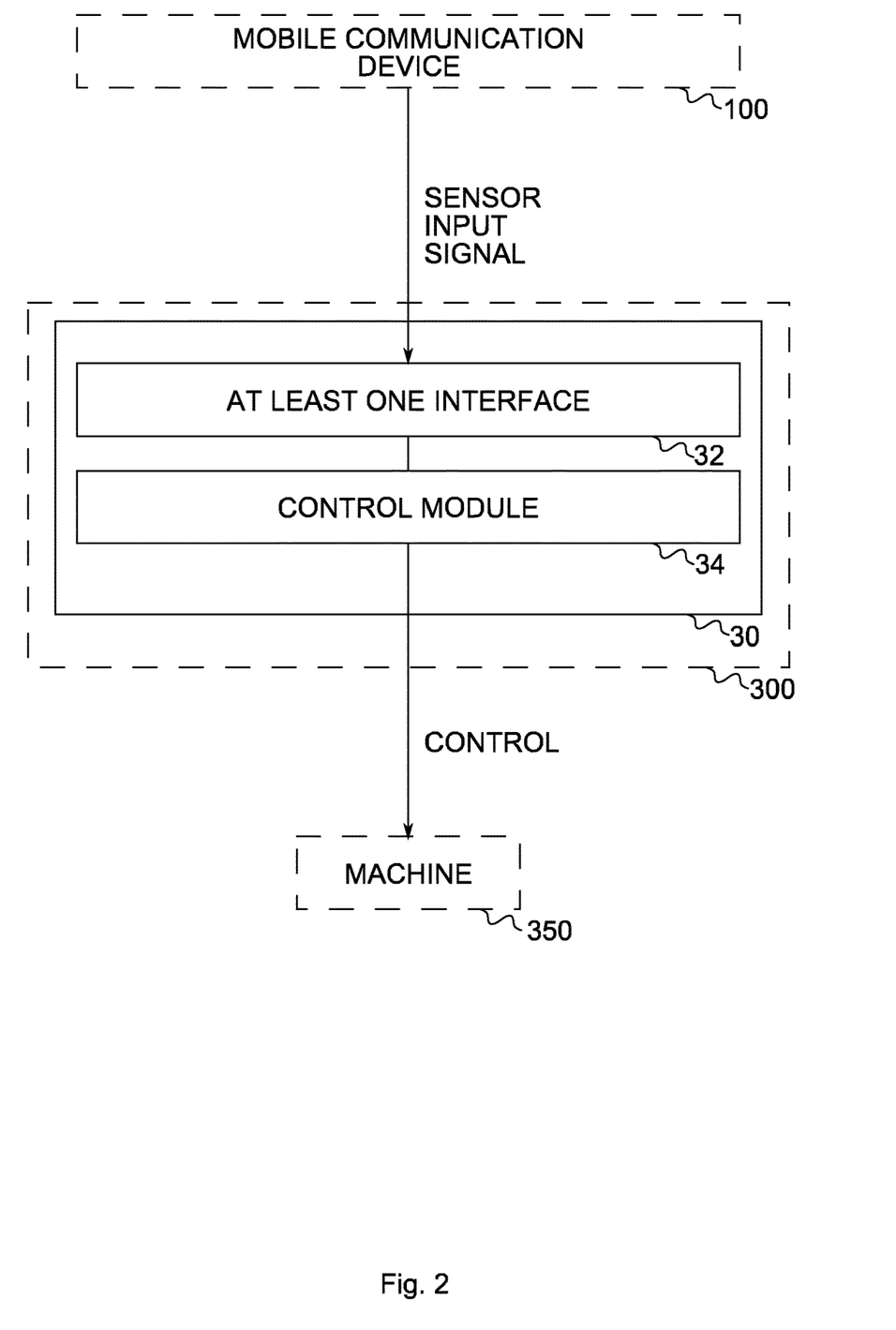
FIG. 2 illustrates a block diagram of an embodiment of an apparatus for a machine control entity for controlling a machine based on a sensor input signal from a mobile communication device.

FIG. 2 illustrates a block diagram of an embodiment of an apparatus 30 for a machine control entity 300 for controlling a machine 350 based on a sensor input signal from a mobile communication device 100. The apparatus 30 comprises at least one interface 32 for receiving the sensor input signal from the mobile communication device 100. The sensor input signal comprises information related to first user input sensor data and information related to second user input sensor data. In at least some embodiments, the first user input sensor data may be provided by a first sensor module 14a, and the second user input sensor data may be provided by a second sensor module 14b. The information related to the first user input sensor data may comprise the first user input sensor data or a pre-processed version of the first user input sensor data, e.g. digital values based on physical properties of an output of the first sensor module. The information related to the second user input sensor data may comprise the second user input sensor data or a pre-processed version of the second user input sensor data, e.g. digital values based on physical properties of an output of the second sensor module.

For example, the apparatus 30 and/or the machine control entity 300 may be validated or verified to an industrial safety norm, e.g. based on a formal verification of a computer program implementing the apparatus 30 and/or the machine control entity 300 and/or based on one or more unit tests.

The at least one interface 32 may correspond to one or more inputs and/or outputs for receiving and/or transmitting information, which may be in digital (bit) values according to a specified code, within a module, between modules or between modules of different entities. In at least some embodiments, the at least one interface 32 may correspond to a wireless communication interface. The apparatus 30 may be configured to wirelessly communicate with the mobile communication device 100.

The apparatus 30 further comprises a control module 34 configured to validate the second user input sensor data based on the first user input sensor data. The validation is based on a comparison of the first user input sensor data with at least one validation criterion. The control module 34 may e.g. be configured to validate the second user input sensor data based on the first user input sensor data indicating a user input correspond to an unlocking of the controlling. The validation criterion may e.g. correspond to pre-defined user input. The pre-defined user input may e.g. correspond to at least one element of the group of a range of touch-screen coordinates indicating an activation or unlocking of the controlling, a directivity of touch screen input indicating an unlocking or activation of the controlling, a lower angle indicating an unlocking or activation of the controlling, an upper angle indicating a locking/deactivation of the controlling, a reference image for comparison with camera sensor data indicating a machine or component of the machine to be controlled, or a directivity/location for comparison with angular or location data, indicating a machine or component of the machine to be controlled. In various embodiments, the control module 34 may be configured to determine whether the first user input sensor data is within a range defined by the validation criterion to validate the second user input sensor data. The first user input sensor data may e.g. correspond to touch coordinates. The control module 34 may be configured to determine whether the touch coordinates are within one of one or more pre-defined areas within a pre-defined coordinate system. The one or more pre-defined areas may e.g. represent one or more pre-defined control actions for controlling the machine 350. The pre-defined areas may e.g. be represented by buttons, fields or sliders, e.g. indicating an activation/unlocking of the controlling.

The control module 34 is further configured to control the machine 350 based on the first user input sensor data and the second user input sensor data after the second user input sensor data has been validated. In various embodiments, the control module 34 may be configured to control the machine 350 based on the first user input sensor data and the second user input sensor data. The control module 34 may be configured to determine a category of the controlling based on the first user input sensor data. The control module 34 may be configured to determine an extent of the controlling based on the second user input sensor data. The category of the controlling may e.g. correspond to at least one element of the group of a directivity of the controlling, a selection of a machine component to be controlled, a selection of a controlling sensitivity, and a selection of controlling limits. The control module 34 may e.g. be configured to transform the second and/or first user input sensor data into machine control information, e.g. touch screen coordinates into a directivity, angular data into a velocity of a movement, angular data into a directivity etc.

In embodiments the control module 34, and/or the control module 16 introduced previously, may be implemented using one or more processing units, one or more processing devices, any means for processing, such as a processor, a computer or a programmable hardware component being operable with accordingly adapted software. In other words, the described function of the control modules 16; 34 may as well be implemented in software, which is then executed on one or more programmable hardware components. Such hardware components may comprise a general purpose processor, a Digital Signal Processor (DSP), a micro-controller, etc. In at least some embodiments, the control modules 16 may be comprised in a program for a mobile communication device, e.g. an app.

In at least some embodiments, the control module 34 may be further configured to determine a sensor feedback signal based on the first user input sensor data, the second user input sensor data and the validation. The sensor feedback signal may comprise information related to a result of a validation comparison of the second user input sensor data based on the first user input sensor data. In at least some embodiments, the control module 34 may be configured to determine the sensor feedback signal to comprise information related to validated versions of the first and second user input sensor data, e.g. first and second user input sensor data user to control the machine 350. In various embodiments, the control module 34 may be further configured to determine the sensor feedback signal based on versions of the first and/or second user input feedback signal checked for plausibility as described subsequently. In various embodiments, the control module 34 may be further configured to determine information related to a representation of the first and/or second user input sensor data for the sensor feedback signal, e.g. for output using the feedback presentation device 20.

In various embodiments, the control module 34 may be further configured to determine a plausibility of the first user input sensor data and the second user input sensor data based on a plausibility criterion. The control module 34 may be configured to control the machine 350 after the first user input sensor data and the second user sensor data has been determined to meet the plausibility criterion. In various embodiments, the plausibility criterion may correspond to at least one element of the group of a lower threshold, an upper threshold, a lower angular threshold, an upper angular threshold, a delta between successive sensor data, or a sequence of sensor data.

In at least some embodiments, the control module 34 may be configured to communicate in an encrypted format using the at least one interface 32, e.g. using encryption built into a communication protocol, e.g. WLAN encryption, or using application level encryption, e.g. to safeguard against an alteration of sensor data due to incursion of an attacker.

In various embodiments, the control module 34 may be further configured to establish a pairing with the mobile communication device 100. The control module 34 may e.g. be configured to accept the sensor input signal from devices paired with the machine control entity. In at least some embodiments, the pairing may be based on a hardware address of the mobile communication device and/or the machine control entity, and/or the control module 34 may be configured to establish a pairing based on an encryption using a combined master key based on a key exchange algorithm. The control module 16 may be configured to establish the pairing in conjunction with the control module 34.

In at least some embodiments, the control module 34 may be configured to stall a controlling of the machine 350 if the sensor input signal is missing at least part of a transmission of sensor data or if the plausibility check determines the user input sensor data to be implausible. In various embodiments, the control module 34 may be configured to signal the stalling as part of the sensor feedback signal to the mobile communication device 100.

At least some embodiments may be based on a "thin client" concept. The control module 34 may be configured to process the user input sensor data supplied by the mobile communication device 100, and the control module 16 may be configured to provide or forward the (first and second) user input sensor data, obtain the sensor feedback signal, and present the feedback using the presentation device 20.

In at least some embodiments, the control module 34 and/or the control module 16 may be configured to add further security and redundancy measures to communication. The control module 34 and/or the control module 16 may e.g. be configured to communicate using sequence monitoring, e.g. using a persistent index to establish an order of transmitted sensor data, feedback, and/or redundancy data, which may be user to identify missing parts of the communication. The control module 34 and/or the control module 16 may further be configured to use a Cyclic Redundancy Check (CRC) to secure messages, e.g. to allow a recovery of lost or corrupted transmissions. The control module 34 and/or the control module 16 may further provide watchdog functionality to identify failed communication or transmissions.

In at least some embodiments, the control module 34 may be configured to provide the sensor feedback signal to the mobile communication device 100, and the sensor feedback signal may be used to output a representation of the sensor feedback signal using the feedback presentation device 20. The control module 16 may be further configured to provide feedback representation feedback to acknowledge an outputting of the sensor data. The feedback representation feedback may comprise values outputted by the feedback presentation device 20. The control module 34 may be configured to check a match of the outputted values and the transmitted sensor feedback signal.

In various embodiments, the control module 34 and/or the control module 16 may be configured to add a time-stamp when communicating, e.g. to identify an order within the communication, and/or to identify delays or a plausibility of sensor data (missing sensor data).

More details and aspects of the semiconductor apparatus 30 (e.g. machine 350, mobile communication device 100, machine control entity 300, sensor input signal, first user input sensor data, second user input sensor data, first sensor module, second sensor module, sensor feedback signal) are mentioned in connection with the proposed concept or one or more examples described above (e.g. FIG. 1). The apparatus 30 may comprise one or more additional optional features corresponding to one or more aspects of the proposed concept or one or more examples described above or below.

Figure 3A:
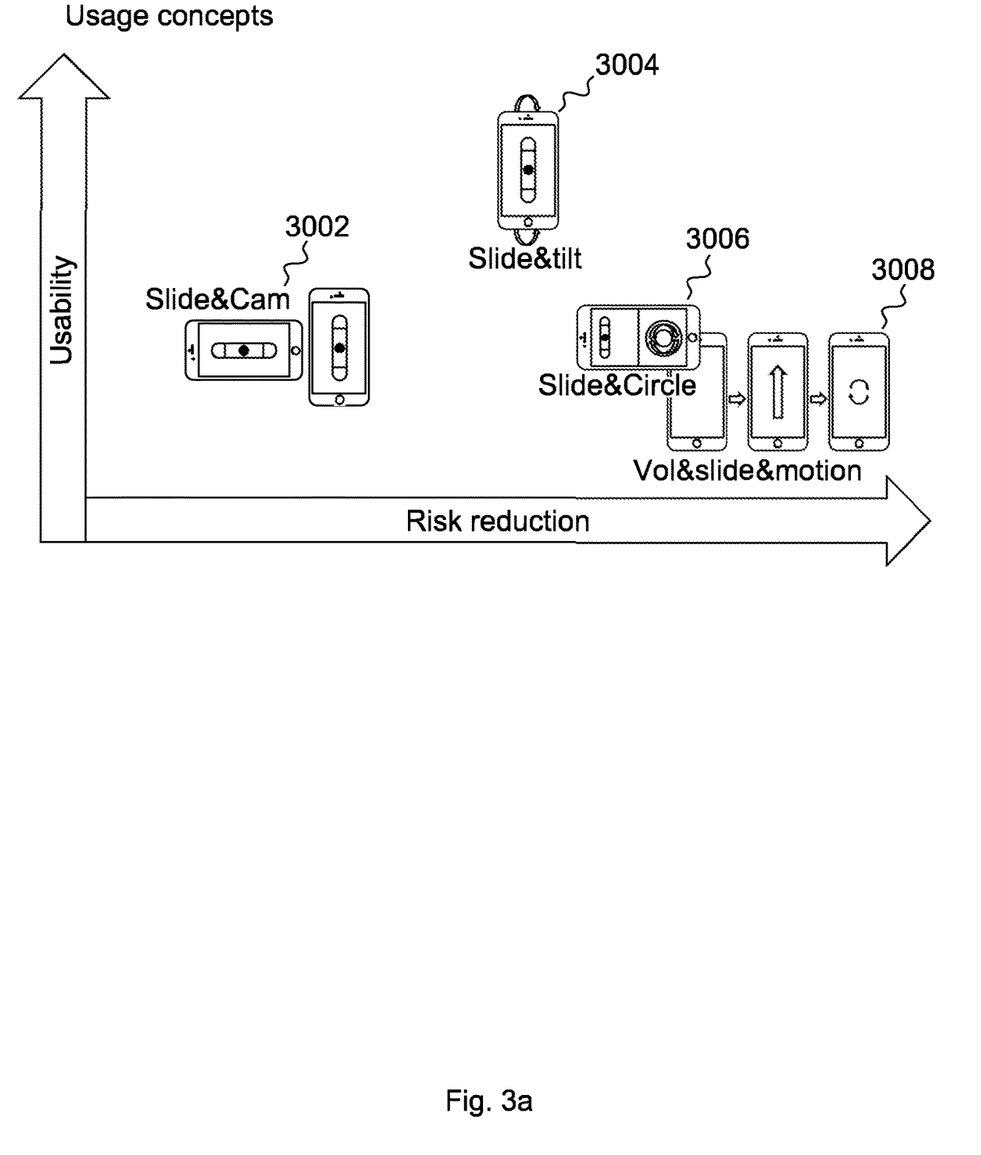
FIG. 3a illustrates a number of exemplary embodiments, wherein an embodiment is based on a touch screen input and camera sensor data, a further embodiment is based on a touch screen input and an angular tilt of a gyroscope, a further embodiment is based on a slider display element and a circular display element and a further embodiment is based on volume buttons, touch screen coordinates and gyroscopic/acceleration sensor data.
Figure 3B:
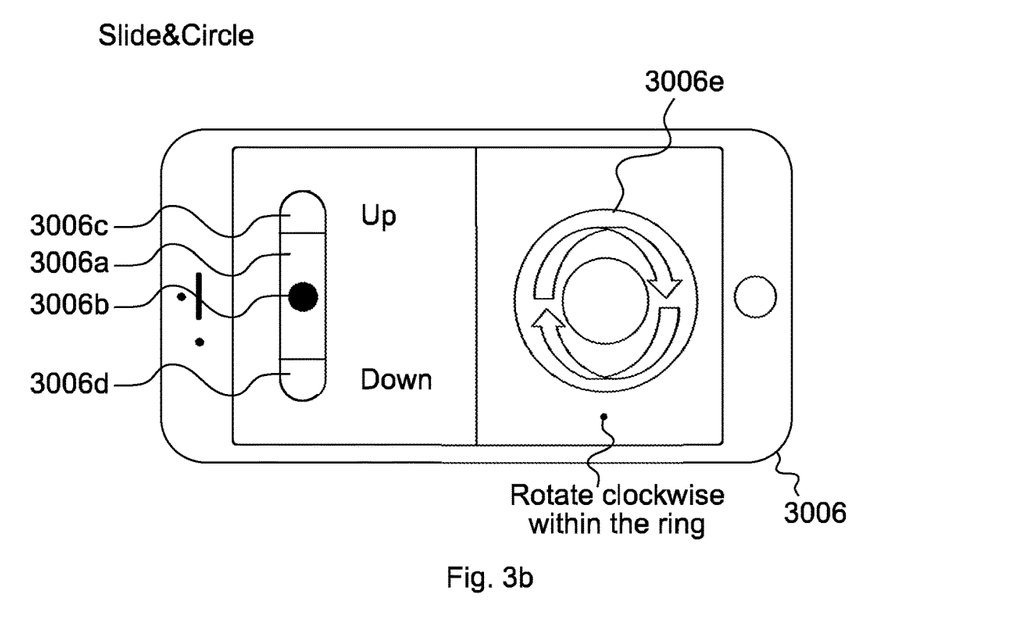
FIG. 3b illustrates an exemplary embodiment based on a slider display element and a circular display element.

FIG. 3a illustrates a number of exemplary embodiments. 3002 illustrates an exemplary embodiment (slide & cam), wherein the first user input sensor data corresponds to touch-screen user input, and wherein the second user input sensor data corresponds to camera sensor data. 3004 illustrates a further exemplary embodiment (slide & tilt), which will be introduced in more detail later. 3006 (also in FIG. 3b) illustrates another exemplary embodiment (slide & circle), wherein the first user input sensor data corresponds to touch screen coordinates of a first section of a touch screen display displaying a slider 3006a comprising a starting point 3006b, an up position 3006c and a down position 3006d. The second user input sensor data may correspond to touch screen coordinates of a second section of the touch screen display showing a circular display element 3006e. Based on the first user input signal data, the controlling is activated/unlocked using the slider 3006a as will be illustrated subsequently (similar to 3004a in FIG. 3c), and based on the second user input sensor data, an extent of the controlling is changed in a continuous circular motion 3006e. 3008 shows another exemplary embodiment based on first, second and third user input sensor data (volume buttons, touch screen coordinates, gyroscopic/acceleration sensor data). FIG. 3a further illustrates a rating of the aforementioned embodiments using the categories usability and risk reduction.

Figure 3C:
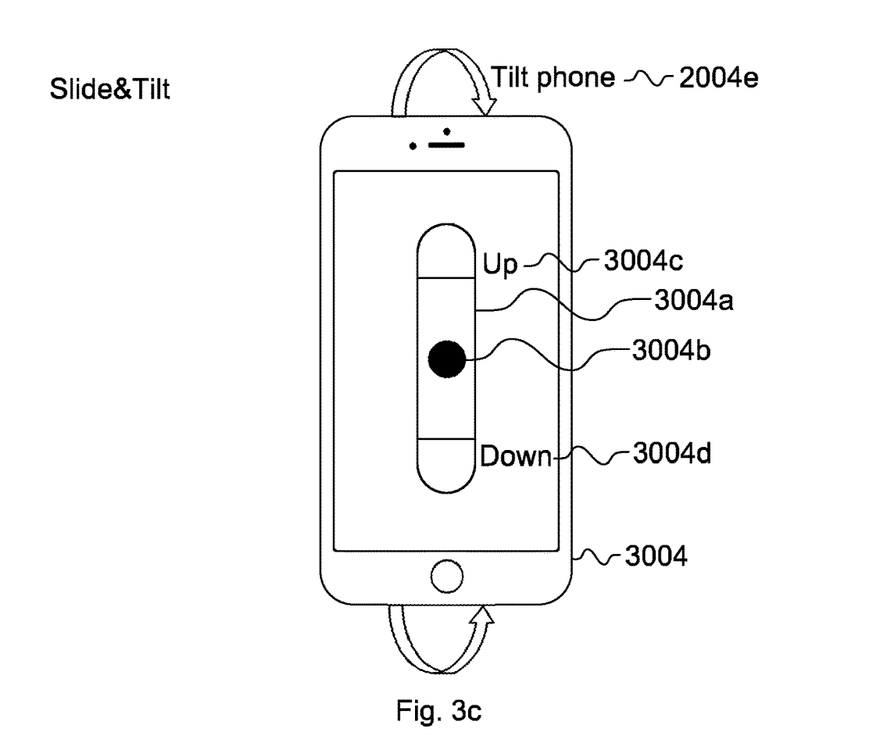
FIG. 3c illustrates another exemplary embodiment based on a touch screen input and an angular tilt of a gyroscope.

FIG. 3c shows an exemplary embodiment (slide & tilt 3004). The first user input sensor data may correspond to touch screen coordinates. The second input sensor data may correspond to angular data (tilt) 3004e of a gyroscope. The control module 16 may be configured to provide the sensor input signal to the machine control entity 300 to control a hitch of a tractor.

In the exemplary embodiment, the apparatus 10 may correspond to an app running on the mobile communication device 100. A user intending to control the hitch may start the app, connect to a machine control entity 300 of the tractor and navigate into a front- or rear-hitch control view. After connection, the machine control entity may validate and check for plausibility the user input supplied by the user.

To move the hitch, the operator may first select the direction via a touch-screen slider 3004a. The user may e.g. put a finger on a button 3004b in the middle of the slider 3004a. Optionally, the user may unlock the slider (as may be indicated by a short vibration feedback). The user may move the slider 3004a in a chosen direction (up 3004c or down 3004d) until a target area or range may be reached. A continuous movement may be required for the touch-screen input to pass the plausibility check at the machine control entity 300.

Then, the operator may tilt 3004e the phone (e.g. to a predetermined amount). Here, too, a continuous movement may be required to pass the plausibility check. The movement may be guided by increasing vibration, and a target area may be signified through a step in vibration. While both "enablers" are in their target area, the hitch may move.

To further increase a usability and safety, a specific vibration design may be used to better distinguish up and down movement as well as different relevant states of the apparatus in general. Correspondingly, the vibration design shall may clearly indicate when the phone is tilted 3004e in a "hitch movement position". Initially the phone may be tilted in a "downward" direction, supporting a "TV remote control metaphor".

Instead of slider-button 3004a; 3004b, in some embodiments, a much larger button design might be chosen to ease the usage. On the other hand, this might in turn favor accidental usage. Visual elements on the feedback presentation device 20 may make it obvious to distinguish "up" and "down". In relation to the target tilting area (i.e. the area that keeps the hitch movement ongoing) there may be a trade-off: the broader, the easier to use, the narrower the higher the safety. The slider might also be realized in a way so that it is not possible to manipulate it directly. First, the finger may need to rest on the slider 3004a for a pre-determined time-period (e.g. 1 second) before it can actually be moved.

In at least some embodiments, the slider 3004a may be realized in a way that makes unwanted manipulation less probable. There may be a continuous finger movement, e.g. from the center 3004b towards the end 3004c; 3004d. When a (rather small) area in the end is then reached, the hitch direction may be chosen and the slide may be successful. For the tilt 3004e, too, a continuous movement may be required. Vibration design (as mentioned before) may guide the tilt action.

In at least some embodiments, the control module 34 may be configured to adjust for a variance in the tilt angular sensor data induced by unsteady hands of an operator and the vibration of the phone to detect stuck-at failures of the tilt sensor, e.g. for the plausibility check. In various embodiments, the tilting amount may be relative to a start position. The start position may be determined by the precedent slide action.

In embodiments, the control module 34 may be configured to control the machine based on a number of criteria. The touch screen coordinates may be used to determine a direction (up, down) and activation (yes, no) of the hitch, while the angular sensor data may be user to activate the hitch movement and extent. The control module 34 may be configured to use thresholds to validate (activate the controlling) based on the first user input sensor data (touch screen coordinates), e.g. the slider is moved into a position, and may further use the second user input sensor data to further validate and/or check for plausibility the first and second user input sensor data, e.g. by using a second threshold for the angular sensor data beyond which a hitch movement starts. The control module 34 may be configured to check the first and second user input sensor data for plausibility, e.g. derived from established failure models for sensors. The control module 34 may e.g. be configured to check for stuck at (random/constant) sensor data, check for a (continuous) change in the sensor data, check for an offset (add/multiply constant), check for noise (add random), check for duplicate sensor data, check for a delay in received sensor data, and/or check for omission of sensor data. In some embodiments, the control module 34 may be configured to use one of the first user input sensor data and the second user input sensor data to validate the (first and/or second) user input sensor data and to control the machine. For example, the control module 34 may be configured to validate the second user input sensor data based on the first and second user input sensor data. For example, the first and second user input sensor data may be based on the same sensor. For example, the first user input sensor data may comprise raw- or meta data of a sensor module and the second user input sensor data may comprise pre-processed sensor data. For example, to validate the second user input sensor data, the control module 34 may be configured to determine, whether an actuator is actuated in conformance with a user's intention (e.g. that the actuation does not lead to harm, neither due to false interpretation of the user intention nor due to failures in the system).

Further, the control module 34 may be configured to determine the plausibility based on the timing of the first and second user input sensor data, e.g. the slide & tilt timing (stop before, start before, fully before, same time, stop after, start after, fully after).

Figure 4:
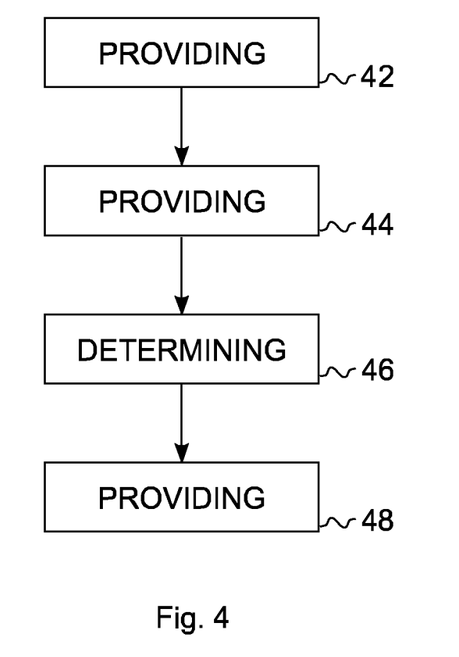
FIG. 4 illustrates a flowchart of an embodiment of a method for a mobile communication device for providing a sensor input signal to a machine control entity to control a machine.

FIG. 4 shows a flow chart of an embodiment of a method for a mobile communication device 100 for providing a sensor input signal to an external machine control entity 300 to control a machine 350. The method comprises providing 42 first user input sensor data. The method further comprises providing 44 second user input sensor data. The method further comprises determining 46 the sensor input signal based on the first user input sensor data and the second user input sensor data. The method further comprises providing 48 the sensor input signal for sensor data processing and validation to the machine control entity 300 to control the machine 350.

Figure 5:
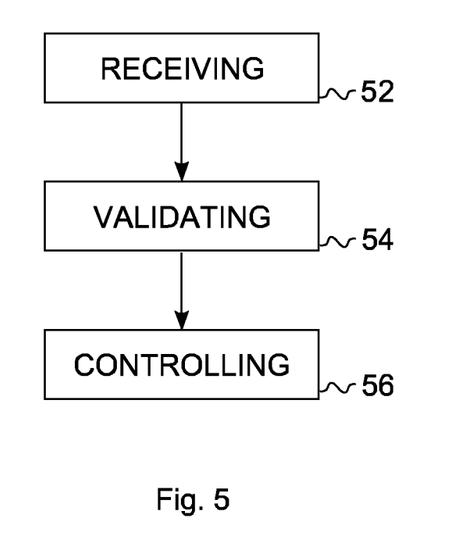
FIG. 5 illustrates a flow chart of an embodiment of a method for a machine control entity for controlling a machine based on a sensor input signal from a mobile communication device.

FIG. 5 shows a flow chart of an embodiment of a method for a machine control entity 300 for controlling a machine 350 based on a sensor input signal from a mobile communication device 100. The method comprises receiving 52 the sensor input signal from the mobile communication device 100. The sensor input signal comprises information related to first user input sensor data and information related to second user input sensor data. The method further comprises validating 54 the second user input sensor data based on the first user input sensor data. The validation is based on a comparison of the first user input sensor data with at least one validation criterion. The method further comprises controlling 56 the machine 350 based on the first user input sensor data and the second user input sensor data after the second user input sensor data has been validated.

Some embodiments comprise a digital control circuit installed within the apparatus for performing the method. Such a digital control circuit, e.g. a Digital Signal Processor (DSP), needs to be programmed accordingly. Hence, yet further embodiments also provide a computer program having a program code for performing embodiments of the method, when the computer program is executed on a computer, a digital processor, or a programmable hardware component. A further embodiment is a computer readable storage medium storing instructions which, when executed by a computer, processor, or programmable hardware component, cause the computer to implement one of the methods described herein.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable pro-grams of instructions where said instructions perform some or all of the steps of methods described herein. The program storage devices may be, e.g., digital memories, magnetic storage media such as magnetic disks and magnetic tapes, hard drives, or optically readable digital data storage media. The embodiments are also intended to cover computers programmed to perform said steps of methods described herein or (field) programmable logic arrays ((F) PLAs) or (field) programmable gate arrays ((F)PGAs), pro-grammed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing or to perform a certain function, respectively. Hence, a "means for s.th." may as well be understood as a "means being adapted or suited for s.th.". A means being adapted for performing a certain function does, hence, not imply that such means necessarily is performing said function (at a given time instant).

The functions of the various elements shown in the Figures, including any functional blocks labeled as "means", "means for controlling", "means for transmitting", "means for receiving", "means for transceiving", "means for processing", etc., may be provided through the use of dedicated hardware, such as "a controller", "a transmitter", "a receiver", "a transceiver", "a processor", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes, which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

The invention claimed is:

1. An apparatus for a mobile communication device for providing a sensor input signal to an external machine control entity to control a machine, the apparatus comprising
one or more sensor modules for providing first user input sensor data and second user input sensor data, wherein the first user input sensor data is based on user input related to an unlocking action and wherein the second user input sensor data is based on user input related to controlling of the machine, and
a control module configured to:
control the one or more sensor modules,
determine the sensor input signal based on the first user input sensor data and the second user input sensor data, and
provide the sensor input signal to the machine control entity to control the machine via an interface,
obtain a sensor feedback signal from the machine control entity via the interface wherein the sensor feedback signal is based on the first user input sensor data and the second user input sensor data, and wherein the sensor feedback signal comprises information related to a validation of the second user input sensor data based on a comparison of the first user input sensor data with a validation criterion.

2. The apparatus of claim 1, wherein the control module is configured to determine a feedback presentation signal based on the sensor feedback signal, and wherein the control module is further configured to provide the feedback presentation signal to a feedback presentation device configured to provide feedback on the first user input sensor data and the second user input sensor data based on the feedback presentation signal.

3. The apparatus of claim 2 further comprising the feedback presentation device, wherein the feedback presentation device corresponds to at least one element of a screen, a vibration module, a light module, an electromechanical tactile display, or a speaker, and/or wherein the feedback presentation device is configured to provide at least one element of the group of audio, visual and tactile feedback, and/or wherein the control module is configured to determine and provide a visual representation of the first user input sensor data and/or the second user input sensor data via the feedback presentation device.

4. The apparatus of claim 1, wherein the one or more sensor modules comprises a first sensor module configured to provide the first user input sensor data and a second sensor module configured to provide the second user input sensor data, and/or wherein the one or more sensor modules comprises at least one element of the group of a touch sensor, an accelerometer, a gyroscope, and a camera sensor.

5. The apparatus of claim 1, wherein the first user input sensor data and/or the second user input sensor data corresponds to raw user input sensor data, and/or wherein the first user input sensor data and/or the second user input sensor data corresponds to at least one element of the group of touch screen coordinates, angular data of a gyroscope, acceleration data of an accelerometer, or imaging data of a camera sensor.

6. The apparatus of claim 1 further comprising the interface, wherein the interface corresponds to a wireless communication interface for communication via a mobile communication system, and wherein the control module is configured to wirelessly communicate with the machine control entity via the interface.

7. The apparatus of claim 1, wherein the first user input sensor data corresponds to touch screen coordinates, and wherein the second input sensor data correspond to angular data of a gyroscope, and wherein the control module is configured to provide the sensor input signal to the machine control entity to control a hitch of a tractor.

8. Apparatus for a machine control entity for controlling a machine based on a sensor input signal from a mobile communication device, the apparatus comprising
at least one interface for receiving the sensor input signal from the mobile communication device, wherein the sensor input signal comprises information related to a first user input sensor data and information related to a second user input sensor data, wherein the first user input sensor data is based on user input related to an unlocking action and wherein the second user input sensor data is based on user input related to controlling of the machine; and
a control module configured to:
validate the second user input sensor data based on the first user input sensor data,
wherein the validation is based on a comparison of the first user input sensor data with at least one validation criterion, and
control the machine based on the first user input sensor data and the second user input sensor data after the second user input sensor data has been validated.

9. The apparatus of claim 8, wherein the control module is further configured to determine a sensor feedback signal based on the first user input sensor data, the second user input sensor data and the validation, wherein the sensor feedback signal comprises information related to a result of a validation comparison of the second user input sensor data based on the first user input sensor data.

10. The apparatus of claim 8, wherein the control module is further configured to determine a plausibility of the first user input sensor data and the second user input sensor data based on a plausibility criterion, and wherein the control module is configured to control the machine after the first user input sensor data and the second user sensor data has been determined to meet the plausibility criterion.

11. The apparatus of claim 8, wherein the control module is configured to determine whether the first user input sensor data is within a range defined by the validation criterion to validate the second user input sensor data.

12. The apparatus of claim 8, wherein the first user input sensor data corresponds to touch coordinates, and wherein the control module is configured to determine whether the touch coordinates are within one of one or more pre-defined areas within a pre-defined coordinate system, wherein the one or more pre-defined areas represent one or more pre-defined control actions for controlling the machine.

13. The apparatus of claim 8, wherein the control module is configured to control the machine based on the first user input sensor data and the second user input sensor data, wherein the control module is configured to determine a category of the controlling based on the first user input sensor data and wherein the control module is configured to determine an extent of the controlling based on the second user input sensor data.

14. The apparatus of claim 13, wherein the category of the controlling corresponds to at least one element of the group of a directivity of the controlling, a selection of a machine component to be controlled, a selection of a controlling sensitivity, and a selection of controlling limits.

15. A method for a mobile communication device for providing a sensor input signal to an external machine control entity to control a machine, the method comprising
   providing first user input sensor data, wherein the first user input sensor data is based on user input related to an unlocking action;
   providing second user input sensor data, wherein the second user input sensor data is based on user input related to controlling of the machine;
   determining the sensor input signal based on the first user input sensor data and the second user input sensor data; and
   providing the sensor input signal to the machine control entity to control the machine, obtaining a sensor feedback signal from the machine control entity wherein the sensor feedback signal is based on the first user input sensor data and the second user input sensor data, and wherein the sensor feedback signal comprises information related to a validation of the second user input sensor data based on a comparison of the first user input sensor data with a validation criterion.

16. A method for a machine control entity for controlling a machine based on a sensor input signal from a mobile communication device, the method comprising
   receiving the sensor input signal from the mobile communication device, wherein the sensor input signal comprises information related to first user input sensor data and information related to second user input sensor data, wherein the first user input sensor data is based on user input related to an unlocking action and wherein the second user input sensor data is based on user input related to controlling of the machine,
   validating the second user input sensor data based on the first user input sensor data, wherein the validation is based on a comparison of the first user input sensor data with at least one validation criterion; and
   controlling the machine based on the first user input sensor data and the second user input sensor data after the second user input sensor data has been validated.

17. Computer program product comprising a non-transitory storage device having a program code embodied therewith, the program code executable by a processor of a computer to perform a method, the method comprising:
   providing first user input sensor data, wherein the first user input sensor data is based on user input related to an unlocking action;
   providing second user input sensor data, wherein the second user input sensor data is based on user input related to controlling of the machine;
   determining the sensor input signal based on the first user input sensor data and the second user input sensor data, and
   providing the sensor input signal to the machine control entity to control the machine,
   obtaining a sensor feedback signal from the machine control entity wherein the sensor feedback signal is based on the first user input sensor data and the second user input sensor data, and wherein the sensor feedback signal comprises information related to a validation of the second user input sensor data based on a comparison of the first user input sensor data with a validation criterion.

18. Computer program product comprising a non-transitory storage device having a program code embodied therewith, the program code executable by a processor of a computer to perform a method, the method comprising:
   receiving the sensor input signal from the mobile communication device, wherein the sensor input signal comprises information related to first user input sensor data and information related to second user input sensor data, wherein the first user input sensor data is based on user input related to an unlocking action and wherein the second user input sensor data is based on user input related to controlling of the machine;
   validating the second user input sensor data based on the first user input sensor data, wherein the validation is based on a comparison of the first user input sensor data with at least one validation criterion; and
   controlling the machine based on the first user input sensor data and the second user input sensor data after the second user input sensor data has been validated.

* * * * *